E. C. CHURCH.
NUT LOCK.
APPLICATION FILED OCT. 8, 1910. RENEWED OCT. 10, 1912.
1,048,039.
Patented Dec. 24, 1912.
2 SHEETS—SHEET 1.
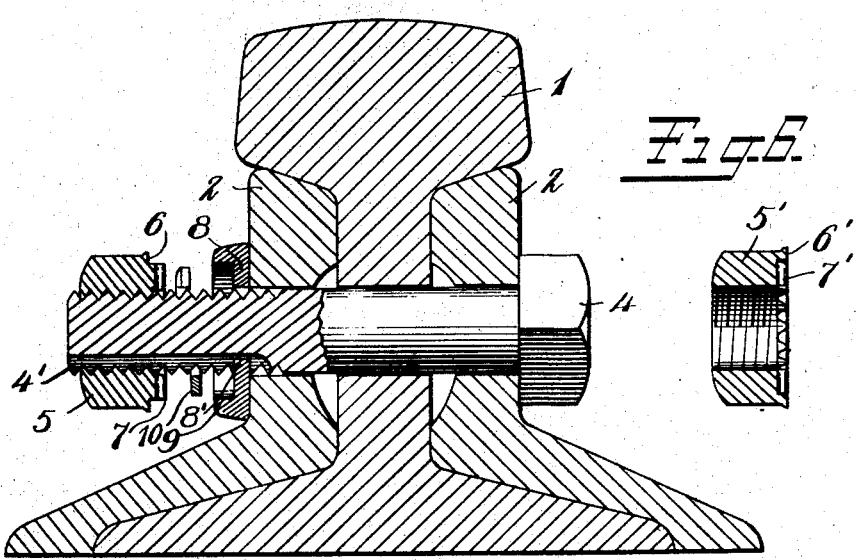
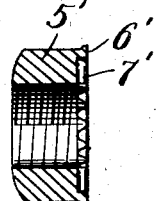
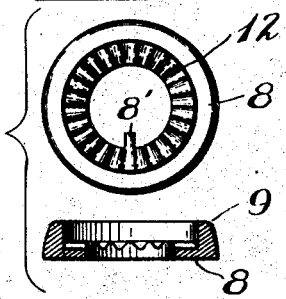
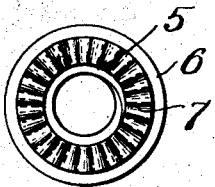
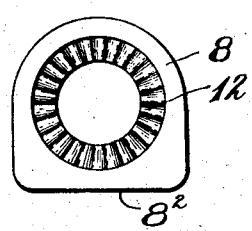
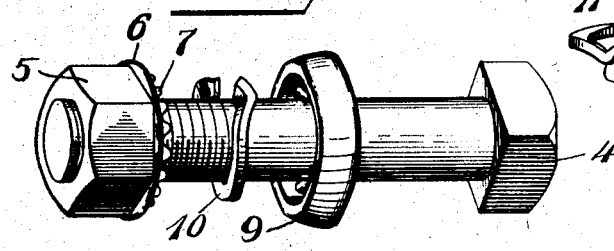

E. C. CHURCH.
NUT LOCK.
APPLICATION FILED OCT. 8, 1910. RENEWED OCT. 10, 1912.
1,048,039.
Patented Dec. 24, 1912.
2 SHEETS—SHEET 2.
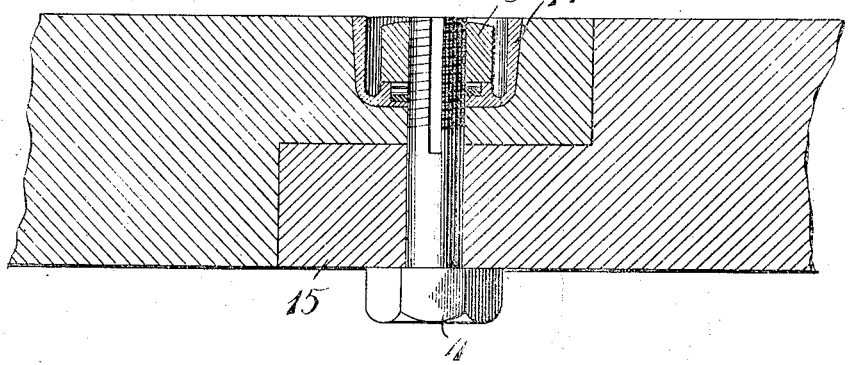
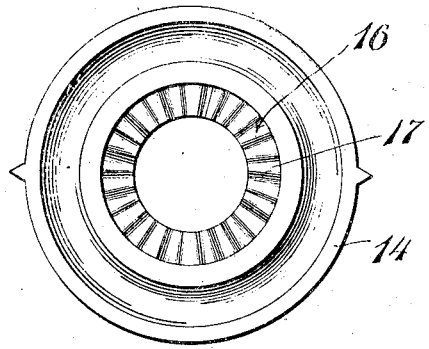
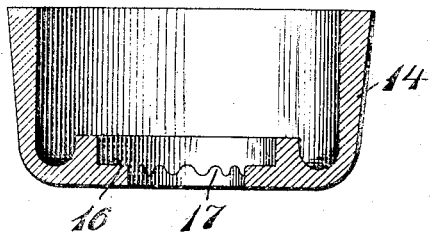
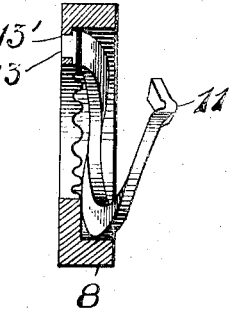
Witnesses:
Inventor
E. C. Church

UNITED STATES PATENT OFFICE.

ELTON C. CHURCH, OF PROVIDENCE, RHODE ISLAND.

NUT-LOCK.

1,048,039. Specification of Letters Patent. Patented Dec. 24, 1912.

Application filed October 8, 1910, Serial No. 585,921. Renewed October 10, 1912. Serial No. 725,097.

*To all whom it may concern:*

Be it known that I, ELTON C. CHURCH, a citizen of the United States, residing at Providence, county of Providence, Rhode Island, have invented certain new and useful Improvements in Nut-Locks, of which the following is a full, clear, and exact description.

My invention relates to nut locks, particularly of the type in which a spring ring or pawl is interposed between the nut and the washer, one or the other, or both, of which parts are provided with stop projections or corrugations engaged by the spring ring or pawl to prevent accidental loosening of the nut. It is desirable in devices of this character to provide a housing for the spring ring or pawl to prevent access of moisture thereto and the consequent rusting thereof. To this end it has been proposed heretofore to provide the nut with a depending flange forming a housing for the ring or pawl, which flange, when the nut is screwed home, tightly engages the washer, thus effectively inclosing the ring. While such form of nut may be readily cast, it is found that in practice to form the same of wrought metal involves prohibitive expense in drawing down or shaping the housing flange. For many purposes it is desirable and often necessary that the nut be formed of wrought metal, especially when it is to be used on automobiles, fine machinery and the like. To meet this need of a wrought metal nut in a device of this character, I form the housing on the washer, by making the same preferably cup-shaped, instead of on the nut, or said washer may be made of cast or wrought metal, as desired, which affords ample strength, since the washer is backed by and supported by the part through which the bolt is secured. The cup shape of the washer, furthermore, adds substantially to its strength and prevents distortion which might result from any irregularity or inequality of the surface against which it is clamped. Consequently a tight joint between the cupped washer and the nut is assured.

A further object of the invention is to provide means for preventing turning of the washer, and a further object is to provide the ordinary cupped washer commonly used on the guard rails of railways and the like, with my improved construction.

With these objects in view, the invention consists in the construction and arrangement of parts, preferred embodiments of which are illustrated in the accompanying drawings, in which—

Figure 1 is a transverse sectional view of a railway rail and fish plates, showing my improved nut lock in conjunction therewith. Fig. 2 shows a perspective view of the bolt and nut lock detached. Fig. 3 comprises a plan and transverse sectional view of one form of washer. Fig. 4 is a plan view of the inner end of the nut. Fig. 5 is a plan view of a modified form of washer. Fig. 6 is a sectional view of a modified form of nut. Fig. 7 is a view of the spring ring or pawl detached. Fig. 8 is a sectional view of a modified form of washer having the spring ring or pawl permanently attached thereto. Fig. 9 is a sectional view of a guard rail showing my improvement as applied to the cup-shaped washer used therewith. Fig. 10 is a plan view of the washer shown in Fig. 9. Fig. 11 is a transverse sectional view of said washer.

In the embodiment of my invention herein selected for illustration, and referring to Fig. 1, 1 indicates the railway rail having fish plates 2—2 secured thereto by means of a bolt 4.

5 indicates a nut which may be of any desired shape to receive a wrench and having a flange 6 and a series of radial corrugations 7 surrounding the bore. These corrugations, as shown in Fig. 1, extend below the flange 6 and form in effect a hub on the inner face of the nut.

8 indicates a washer having the raised flange 9 which forms a housing to receive the locking spring ring or pawl 10. Any desired means may be adapted for preventing turning of the washer on the bolt, as for example the lug 8' engaging a groove 4' in the bolt, or one side of the washer may be straight, as indicated at $8^2$, Fig. 5, said straight side engaging the angle of the fish plate or other adjacent part.

The ring 10 (Fig. 7) is normally of spiral form, upon the opposite ends of which are preferably formed projections or shoulders 11. In the ring here shown, these shoulders are formed by suitably bending the material of the ring. They may, however, consist of mere enlargements on the ends of the ring.

The bottom of the housing of the washer is provided with a series of radial corrugations 12, which, together with the corrugations 7 of the nut, coöperate with the projections 11 on the spring ring or pawl 10 to prevent accidental loosening of the nut when the latter is screwed home. When the nut is screwed home, the ring is seated within the housing of the washer and the flange 6 of the nut seats snugly upon the raised flange of the washer, thus effectively inclosing the spring ring against access of moisture by which it might become rusted.

The flange 6 on the nut makes it possible to use the nut with washers of different diameters and also with spring rings of different diameters within that of the washer. Hence a nut of standard size but with a comparatively wide flange may be used with many different sizes of washers and rings.

In Fig. 6 is shown a slightly modified form of nut in which the projections of the corrugations 7' are flush with the inner surface of the flange 6'.

In the constructions heretofore described, the spring ring or pawl is entirely separate and distinct from the other elements of the device. Owing to the liability of losing the spring ring and thus rendering the device useless, it may in some cases be desirable to permanently attach the ring either to the washer or to the nut. To this end, one end of the ring (Fig. 8) may be riveted or otherwise secured to the washer at 13, in which case the enlargement upon the opposite end will coöperate with the corrugations on the nut. Similarly a ring may be permanently secured to the nut and its opposite end coöperate with the corrugations on the washer. Furthermore, sockets or perforations 13' may be provided, both in the nut and washer, to receive the bent end 13 of the ring, whereby the latter may be attached permanently and interchangeably either to the washer or nut, so that should the corrugations on either of these members become worn, the ring may be shifted from one to the other.

In the embodiment of the invention illustrated in Figs. 9, 10 and 11, 14 indicates a cupped washer of the kind usually used with the bolts for securing together the adjacent ends of guard rail sections 15. In this case the base of the washer is provided with the recess 16 having corrugations 17 at the bottom to coöperate with the ring and nut such as heretofore described. The sides of the washer may, if desired, be provided with ribs or corrugations to engage the material of the guard rail to prevent turning of the washer. Any other means for this purpose, however, may be adopted.

While I have herein described preferred embodiments of my invention, it is to be understood that the same may be varied in detail and arrangement of parts within the scope of the appended claims.

What I claim is:

1. A nut lock comprising a bolt, a washer recessed on one face, means to prevent rotation of the washer on said bolt, a nut adapted to be seated upon the wall of said recess, a locking ring or pawl entirely separate and distinct from said nut and washer and interposed between said members, the wall of said recess being deeper than the thickness of said ring, the bottom of said recess and the opposing face of said nut having means coöperating with said ring or pawl to prevent accidental loosening of the nut, said recessed washer forming a housing for the said ring or pawl.

2. A nut lock comprising a bolt, a washer having an upstanding flange adapted to form a comparatively wide recess around the bolt, means to prevent rotation of the washer on said bolt, a nut having a flange adapted to seat upon the washer flange, the bottom of said recess and the opposing face of said nut having locking corrugations, a locking ring or pawl separate and distinct from said washer and interposed between said washer and nut and having portions adapted to engage said corrugations respectively to prevent accidental loosening of the nut, said flanged washer forming a housing for said ring deeper than the thickness of said ring and adapted to be closed by the flange of said nut.

3. A nut lock comprising a bolt, a cup-shaped washer having corrugations at the base of the recess therein, means to prevent rotation of said washer on said bolt, a nut having a flange adapted to seat upon the edge of said recess and having corrugations opposed to the washer corrugations, a locking ring or pawl separate and distinct from said washer and nut, having projections adapted to coöperate with the corrugations on the nut and washer respectively, said cup washer forming a housing for said ring adapted to be closed by said nut.

ELTON C. CHURCH.

Witnesses:
  R. C. POWELL,
  CHAS. W. PEARD.